United States Patent [19]

Drobadenko et al.

[11] Patent Number: 4,992,006

[45] Date of Patent: Feb. 12, 1991

[54] DEVICE FOR HYDRAULIC CONVEYANCE OF LOOSE MATERIALS

[76] Inventors: Valery P. Drobadenko, Pogonny proezd, 2, kv.31; Sergei J. Chepov, Sirenevy bulvar, 43a, kv.128, both of Moscow, U.S.S.R.

[21] Appl. No.: 480,633

[22] Filed: Feb. 14, 1990

[51] Int. Cl.⁵ .............................................. B65G 53/40
[52] U.S. Cl. ...................... 406/109; 406/28; 406/119; 406/146; 406/168
[58] Field of Search .................. 406/14, 28, 30, 109, 406/119, 136, 146, 168

[56] References Cited

U.S. PATENT DOCUMENTS

| 3,140,123 | 7/1964 | Bowen | 406/109 |
| 4,371,294 | 2/1983 | Sakamoto | 406/109 |
| 4,378,183 | 3/1983 | Ackerman | 406/109 |

FOREIGN PATENT DOCUMENTS

| 391974 | 7/1973 | U.S.S.R. | |
| 604773 | 4/1978 | U.S.S.R. | 406/109 |
| 612873 | 6/1978 | U.S.S.R. | |
| 615015 | 7/1978 | U.S.S.R. | |
| 798000 | 1/1981 | U.S.S.R. | |
| 1168496 | 7/1985 | U.S.S.R. | |

Primary Examiner—Joseph F. Peters, Jr.
Assistant Examiner—Carla Mattix
Attorney, Agent, or Firm—Lilling and Lilling

[57] ABSTRACT

A device for hydraulic conveyance of loose materials comprises a toroidal chamber having an equatorial plane thereof set with respect to a horizontal plane at an angle ($\alpha$) falling within a range of $$\phi < \alpha < 90°,$$

where $\phi$ is the angle of internal friction of the loose material, when saturated with the liquid used for hydraulic conveyance. The chamber is provided with pipes for charging the loose material and for discharging the liquid, both of the pipes being arranged on one side with respect to the meridianal plane, and a slurry discharge unit arranged on its other side.

10 Claims, 5 Drawing Sheets

DEVICE FOR HYDRAULIC CONVEYANCE OF LOOSE MATERIALS

FIELD OF THE INVENTION

The invention relates generally to conveyance of materials by virtue of hydraulic means and, more specifically, to a device for hydraulic conveyance of loose materials.

The invention is successfully applicable in the mining industry, in civil engineering, metallurgy, and in the farming industry for hydraulic conveying of loose materials over long distances.

Of special interest is practical application of the industry for hydraulic conveyance of such loose materials as mineral raw materials, in dressing practice when mining placer and ore deposits of the opencast and underground mining techniques, as well as in construction of hydraulic engineering structures.

BACKGROUND OF THE INVENTION

At the present time, devices for hydraulic conveyance of loose materials, comprising a chamber provided with a loose material charging unit and a slurry discharge unit and making integral part of hydraulic conveyance installations incorporating additional components such as water pumps, pipelines, stop valves and fittings, should meet a number of requirements including reliable operation of such devices ruling out clogging of the discharge unit with the loose material, or hanging of the loose material in the chamber, which stems from the strength of the chamber; as well as efficient charging of the loose material resulting from minimized amounts of the loose material particles carried away with the liquid being discharged during filling and minimized amount of air fed into the chamber. Another requirement to be met resides in efficient slurry discharge due to low classifying of the loose material which is uniformly fed to the discharge unit.

One state-of-the-art device for hydraulic conveyance of loose materials is known (SU, A, No. 615,015) to comprise a vertically installed chamber having a cylindrical shape and provided with a pipe for charging the loose material in the form of slurry, which pipe also serves as a pipe for discharging the slurry into a pulp feeding pipe, a pressure liquid flow feeding pipe, and a liquid discharge pipe located in the top portion of the chamber.

To minimize the amount of the loose material particles carried away with the liquid being discharged, the chamber is charged in an upward flow, while the liquid being discharged is separated from the loose material being charged, by means of a screen which is adapted to move lengthwise the chamber as it is being charged from below and intended to reduce the amount of the loose material particles carried away by the liquid being discharged.

Provision of a movable screen inside the chamber renders the construction more sophisticated and reduces its reliability. Moreover, charging the slurry in an upward flow results in intense classifying of the loose material in terms of density and size, which is also the case during discharge of the chamber, with attendant instability of the slurry density.

Thus, the aforedescribed device fails to provide the conveyance of stable density slurry to the pulp feeding pipe, while a reduction in the amount of the loose material carried away by the liquid being discharged is attained at the expense of reliability of the device.

One more prior-art device for hydraulic conveyance of loose materials (SU, A, No. 391,974) is known to comprise a vertically installed chamber having a cylindrical shape. Preparatory to charging, part of the liquid is expelled from the chamber through a pipe provided in its bottom portion, in order to minimize the amount of the loose material carried away.

To reduce the classifying taking place, when the chamber is being discharged, the pressure liquid flow is divided into two flows fed into the chamber through two pipes one of which is located in the top portion of the chamber.

The additional operations such as draining the liquid preparatory to charging and delivery of the part of the liquid flow during discharge, considerably reduce the efficiency of the device and render its control system more sophisticated. At least three chambers are required to enable continuous discharge of the slurry into the pulp feeding pipe. The aforementioned device features low reliability resulting from the fact that the chamber may only be charged with dry or dehydrated material tending to hang up in the chamber, which promotes clogging of the discharge pipe if water content of the loose material is too low.

By-passing part of the pressure liquid flow upward the chamber reduces the stability of slurry density, because in the course of discharging the ratio between the pressure liquid flow rates is changed due to increased rate of the pressure liquid make-up flow. Effective control over the ratio between the rates of the main flow and the make-up (upper) flow of the pressure liquid is virtually unfeasible.

Known presently are other devices for hydraulic conveyance of loose materials (SU, A, No. 612,873; SU, A, No. 798,000) where attempts have been made to reduce the amount of the loose material particles carried away during charging.

In the former of the embodiments mentioned hereinbefore, air is force fed into the top portion of a cylindrically shaped chamber during discharge. As a result, after discharge is over, the chamber remains empty without the need to drain the liquid.

However, the above-described device offers but a low margin of safety because of possible loss of leaktightness of the chamber, with attendant hazard of compressed air bursting. Power consumption of the device is far too high to effect hydraulic conveyance over long distances. This predetermines the use of a compressor having a power capacity greater than that of the primary pressure unit—the water pump. Furthermore, the device suffers from low production efficiency resulting from the fact that the device can only be charged when the pressure inside the chamber is reduced to the atmospheric pressure.

In the latter of the devices mentioned hereinbefore, the chamber is made in the form of a hydraulic cyclone, which allows the discharged liquid to be separated and diverted while the slurry is being charged into the chamber. In such an embodiment, the top portion of the chamber operating as a hydraulic cyclone, is subject to fast wear, which in turn affects adversely the chamber strength characteristics.

In the above-discussed devices, the chamber discharge process is accompanied by classifying of the loose material taking place as it is being expelled from the chamber by the liquid. The classifying occurs due to segregation of the loose material as it descends, the smaller and lighter particles being suspended.

Still another device for hydraulic conveyance of loose materials (U.S. Pat. No. 1,168,496) is known to comprise a toroidal chamber having a meridianal plane and an equatorial plane and provided with pipes for charging the loose material and discharging the liquid used for hydraulic conveyance, both of the pipes being arranged on one side with respect to the meridianal plane of the toroidal chamber, and with a slurry discharge device arranged on the other side with respect to the meridianal plane, the equatorial plane of the chamber being disposed vertically.

The toroidal shape of the chamber contributes to its higher strength and minimizes specific metal consumption.

Loose materials can be charged into the toroidal chamber in the form of slurry by loading it in a standstill zone on the surface of the throat of the toroidal chamber, that is on the inner wall in its upper portion. From the inner wall, the loose material slips down until lumps of the material drop down in a restrained manner, thus minimizing the amount of the loose material particles carried away by the liquid discharged because additional energy is required to break the particles loose from the bulk of the material. Besides, the portion of the toroidal chamber disposed above its throat used for charging the loose material, has a larger cross-section than the aforedescribed chambers having different shapes but the same volume. Because of this, the uplift rate of the liquid being discharged is less than that in any of the above-mentioned devices, and it tends to decline still further as the distance between the cylindrical portions of the chamber or the chamber throat radius increases.

However, as the operating efficiency of such devices increases, which involves greater flow rates of the slurry being handled, the amount of the loose material particles carried away by the liquid discharged tends to increase as well, since the material charging portion of the throat fails to accept all the loose material fed in, with the result that part of the loose material is repelled by the throat surface, thus causing slurry swirling flows.

As compared to chambers of the other shapes described hereinbefore, use of a toroidal chamber enables the loose material to be more uniformly fed to the discharging unit, and the loose material is less liable to classifying by virtue of the fact that the loose material is circumfluent the lower portion of the throat surface in a downward flow, whereas the liquid is circumfluent the same throat portion in an upward flow. Such an arrangement of the flows makes it possible to reduce the resistance of the liquid to the loose material because of the fact that the major liquid flow is formed nearby the throat wall, viz., close to the inner wall of the chamber. However, in common with the aforedescribed devices, as the height of the vertical cylindrical portions of the chamber increases, the loose material is liable to be segregated by particle size and density, as for height of these portions, which is causative of classification and reduced stability of the slurry density.

BRIEF SUMMARY OF THE INVENTION

It is therefore an object of the present invention to provide a device for hydraulic conveyance of loose materials, which would ensure a reduction in the amount of the loose material carried away by the liquid discharged, when the loose material is being charged into the chamber, and an increase in the stability of density of the slurry being handled.

With the foregoing and other objects in view the present invention thus resides in the fact that in a device for hydraulic conveyance of loose materials, comprising a toroidal chamber having a meridianal plane and an equatorial plane and provided with pipes for charging the loose material and discharging the liquid used for hydraulic conveyance, both of the pipes being arranged on one side with respect to the meridianal plane of the toroidal chamber, and with a slurry discharge device arranged on the other side with respect to the meridianal plane, according to the invention, an angle defined between the equatorial plane of the toroidal chamber and a horizontal plane, be within a range of $$\phi < \alpha < 90°,$$

where $\alpha$ is the angle defined between the equatorial plane of the toroidal chamber and a horizontal plane;

$\phi$ is the angle of internal friction of the loose material, when saturated with the liquid used for hydraulic conveyance.

It is expedient that in a device for hydraulic conveyance, according to the invention, the angle defined between the equatorial plane of the toroidal chamber and a horizontal plane, be within a range of $$40° \leq \alpha \leq 45°.$$

It is favourable that in a device for hydraulic conveyance, according to the invention, the toroidal chamber be provided with a partition plate fitted in its upper part and disposed substantially in the equatorial plane so as to form two spaces arranged one below the other, the lower space being associated with the loose material charging pipe, while the upper space communicates with the liquid discharge pipe.

It is advantageous that a device for hydraulic conveyance, according to the invention, be provided with a loose material flow shaper and/or a discharge liquid flow shaper accommodated inside the respective spaces.

It is effective that in a device for hydraulic conveyance, according to the invention, the shaper forming the flow of the loose material and the shaper forming the flow of the liquid being discharged are made each in the form of at least one plate set with respect to the partition plate at an acute whose vortex is directed towards the upper part of the toroidal chamber.

It is reasonable that in a device for hydraulic conveyance, according to the invention, when the shapers forming the flows of the loose material and the liquid being discharged are made in the form of a plurality of plates, the plates be disposed at substantially the same acute angle with respect to the partition plate.

In a device for hydraulic conveyance of loose materials, when an angle defined between the equatorial plane of the toroidal chamber and a horizontal plane, falls within the above-specified limits, the current of the loose material being charged will divide into two flows running down the chamber walls along the wall portions situated below the equatorial plane, until the chamber is filled completely. As the liquid is being discharged, no vigorous carryaway of the loose material takes place since the bulk of the loose material charged is not in suspension. Inclination of the chamber within the above-specified limits during discharge provides a substantial reduction of the classifying of the loose material over the chamber volume, hence better stability of density of the slurry handled, by virtue of the fact that the loose material sinks to the discharging unit along the lower wall while being replaced by the liquid rising above the loose material along the upper wall of the chamber. As this takes place, interaction between the liquid and the loose material is minimized. Besides, the minimized interaction between the replacing liquid and the loose material enables it to be uniformly fed to the discharging unit, which adds to stability of the slurry density.

BRIEF DESCRIPTION OF THE DRAWINGS

In what follows the present invention will now be disclosed in a detailed description of an illustrative embodiment thereof with reference to the accompanying drawings, wherein.

DETAILED DESCRIPTION OF THE INVENTION

Figure 1:
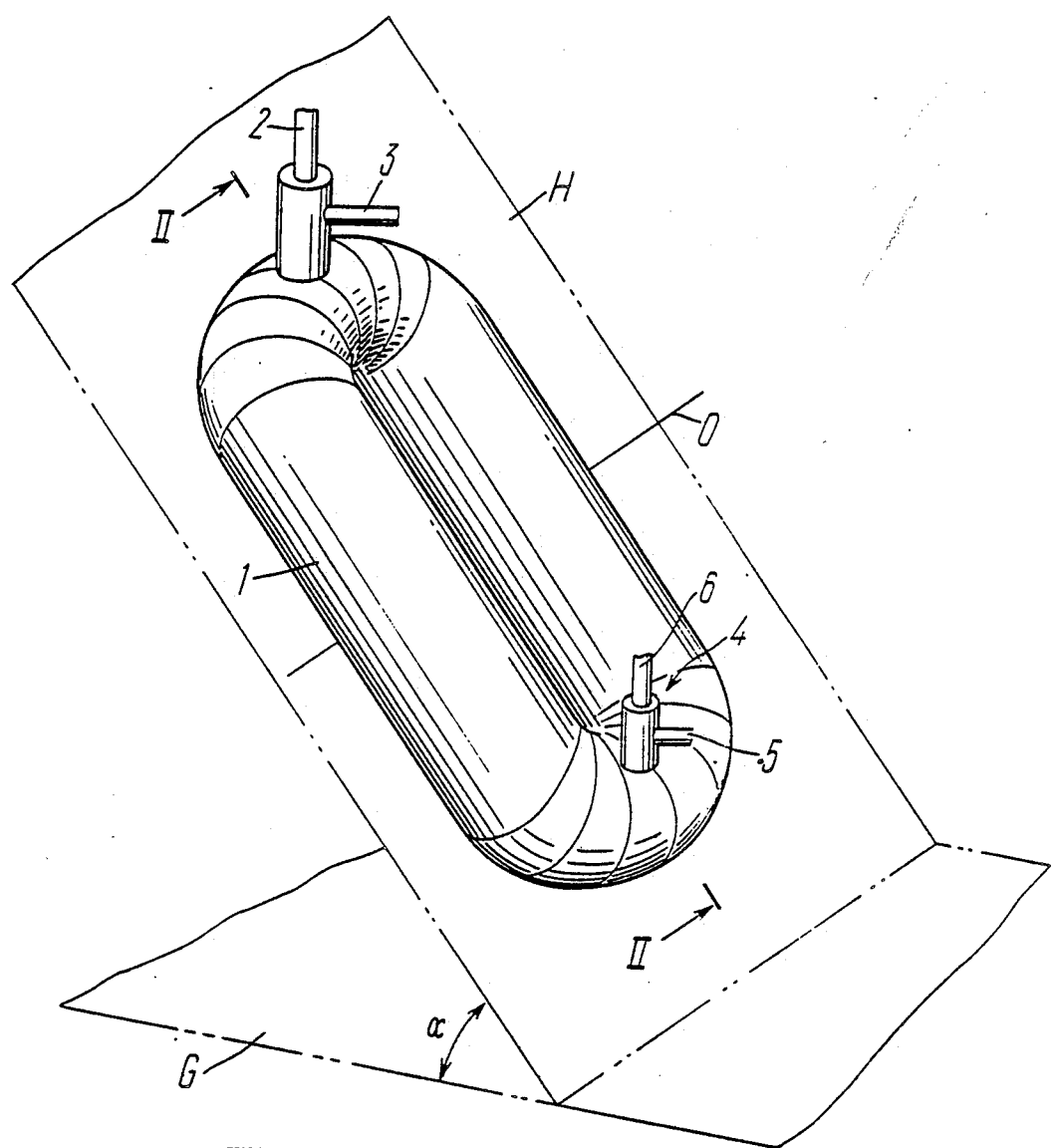
FIG. 1 is a general view of a device for hydraulic conveyance of loose materials (an isometric drawing), according to the invention.

A device for hydraulic conveyance of loose materials comprises a toroidal chamber 1 (FIG. 1) provided with a pipe 2 for charging the loose material and a pipe 3 for discharging the liquid, both of the pipes being arranged on one side with respect to a meridianal plane of the chamber 1 (the intersection between the meridianal plane and an equatorial plane H is denoted "0"). A slurry discharge unit 4 is arranged on the other side of the meridianal plane. The equatorial plane H of the chamber 1 is inclined with respect to a horizontal plane G at an angle $\alpha$ falling within a range of $$\phi < \alpha < 90°,$$

where $\phi$ is the angle of internal friction of the loose material, when saturated with the liquid used for hydraulic conveyance.

The slurry discharging unit 4 comprises a pipe 5 for feeding the pressure liquid flow and a pipe 6 for discharging the slurry.

The minimum angle of inclination of the chamber 1 is determined proceeding from the condition of reliable transfer of the loose material to the slurry discharge unit 4 under gravity.

If the equatorial plane H of the chamber 1 is inclined at an angle $\alpha$ equal to or less than $\phi$, mobility of the particles is drastically reduced, which impedes the supply of the loose material to the slurry discharging unit 4 and renders the device operation impracticable.

Studies have shown that even slight misalignment between the equatorial plane H and the vertical plane leads to sharp segregation of the loose material flow from the flow of the liquid discharged, which reduces the amount of the loose material particles carried away by the liquid discharged. However, particles of the loose material remain to be in suspension under the action of the upward flow of the liquid discharged, but it tends to decrease if the misalignment from the vertical plane increases still further. A substantial reduction in the amount of particles suspended is observed if $\alpha < 45°$.

Studies have also demonstrated that if $\alpha < 40°$, the amount of material particles carried away increases. Therefore, an optimum arrangement of the chamber 1 will be provided when $\alpha$ falls within a range of $$40° \leq \alpha \leq 45°.$$

If the loose material is charged in greater amounts or after the chamber 1 has been completely charged, turbulent interaction between the flows of the loose material and the liquid discharged may be encountered. To maintain the laminar nature of these flows, the chamber 1 is provided in its upper portion with the partition plate 7 (FIG. 2) arranged substantially in the equatorial plane H so as to form two spaces 8, 9 disposed one below the other. The lower space 8 communicates with the pipe 2 for charging the loose material, while the space 9, with the pipe 3 for discharging the liquid. Length 1 of the partition plate is equal to or less than the diameter of the generator circumference of the chamber 1.

Figure 2:
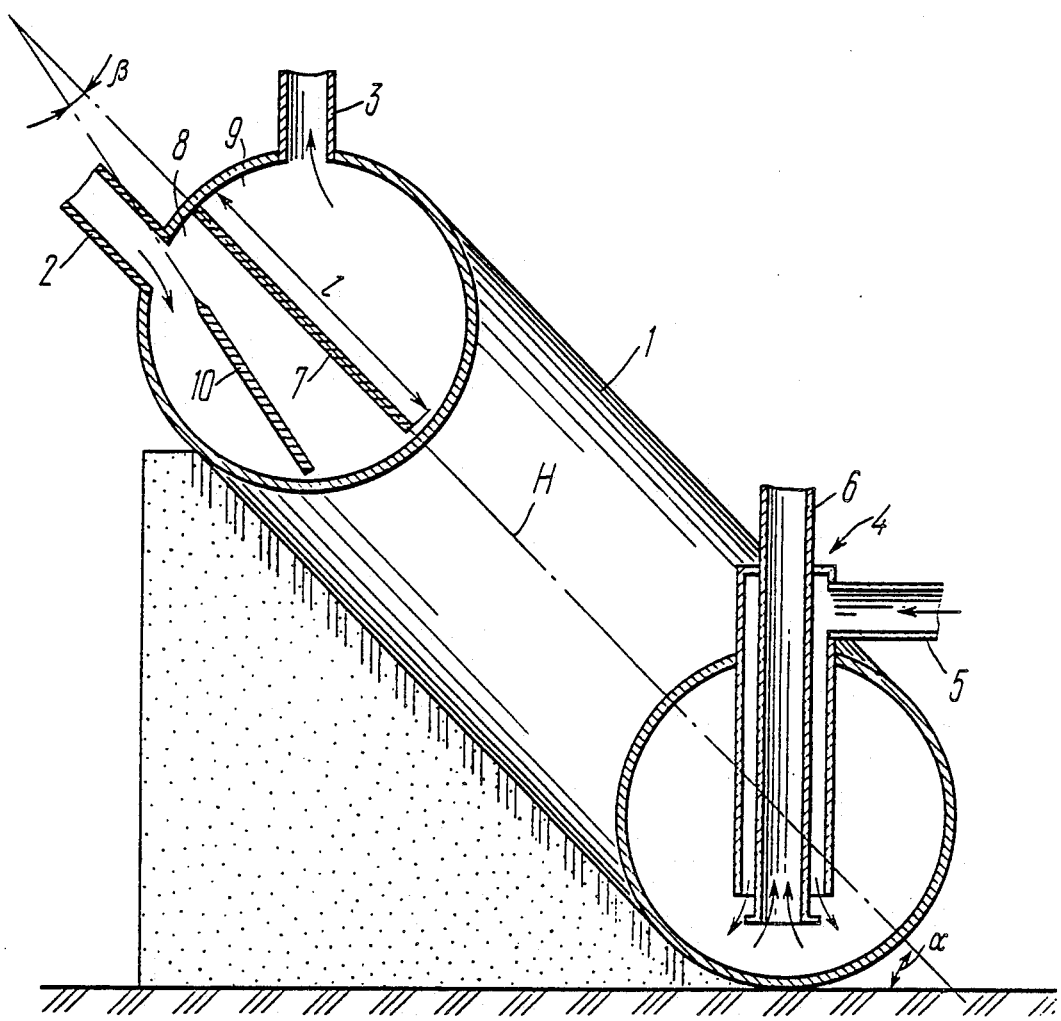
FIG. 2 is a general sectional view of a device for hydraulic conveyance of loose materials taken on a meridianal plane and showing a partition plate arranged in an equatorial plane of the chamber, and a shaper of the loose material flow fitted in the lower chamber as related to the partition plate, according to the invention.
Figure 3:
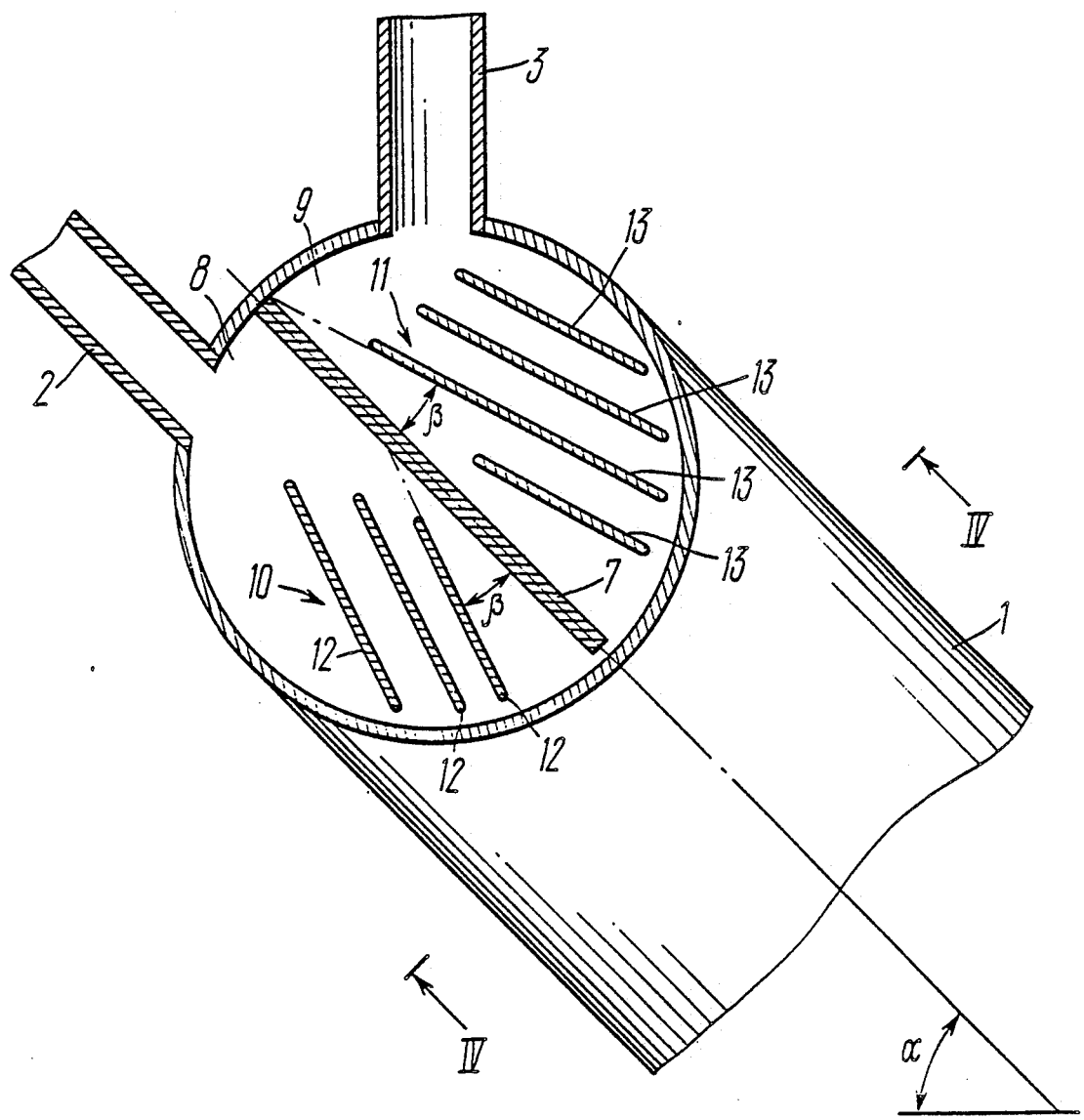
FIG. 3 is a sectional view taken on the meridianal plane and showing the chamber with the partition plate, the loose material flow shaper and a discharge flow shaper fitted in their respective spaces, according to the invention.
Figure 4:
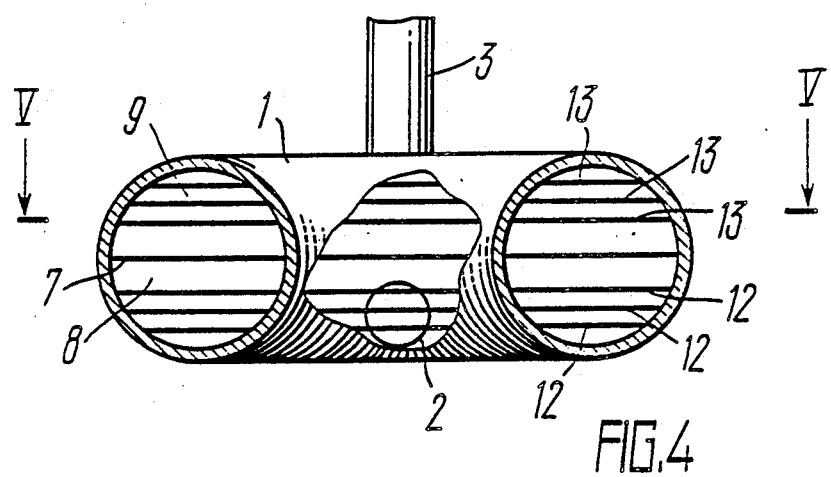
FIG. 4 is a sectional view taken on the line IV—IV in FIG. 3 (with the chamber wall partly cut away)
Figure 5:
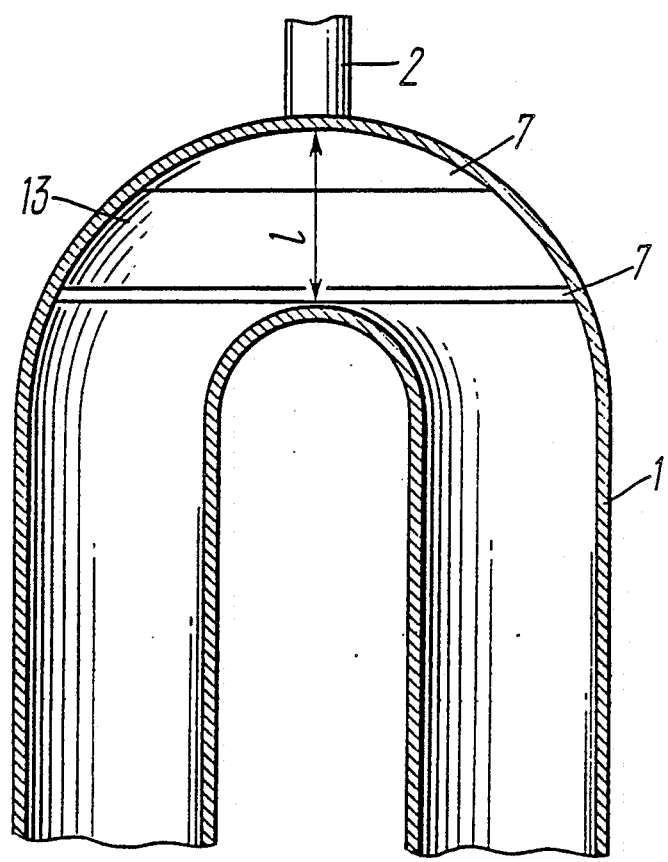
FIG. 5 is a sectional view taken on the line V—V in FIG. 4.

To maintain the flows of the loose material and the liquid discharged under the conditions close to the laminar flow, the device is provided with a loose material flow shaper 10 and/or a discharge liquid flow shaper 11 (FIG. 3) accommodated inside the respective spaces 8, 9. The shapers 10, 11 are made each in the form of at least one plate set with respect to the partition plate 7 at an acute angle $\beta$ whose vortex is directed towards the upper part of the chamber 1. The loose material flow shaper 10 as illustrated in FIG. 2 is made in the form of one plate, while the shaper 10 and the discharge liquid flow shaper 11 as shown in FIG. 3, are made in the form of a plurality of plates 12 (FIG. 4) and 13 (FIGS. 4, 5), respectively. All the plates 12 (FIG. 3) and 13 are disposed at substantially the same acute angle. According to one of the embodiments, the angle of inclination of the plates 12 of the shaper 10 differs from the angle of inclination of the plates 13 of the shaper 11. Magnitude of the angle $\beta$ is selected so as to prevent clogging of the plates 12 with the loose material during charging, and to preclude considerable resistance of the plates 13 to the flow of the liquid being discharged.

The lower edges of the plates 12 are situated at the level of the lower edge of the partition plate 7 and above it, while the upper edges are spaced a certain distance apart from the walls of the chamber 1, which enables the loose material flow to be freely distributed in the clearances between the plates 12. This distance may be equal to the diameter of the pipe 2 for charging the loose material or be at least three to five times the diameter of the maximum size of the largest fraction of the loose material handled.

A device for hydraulic conveyance of loose materials makes an integral part of an installation for hydraulic conveyance. To provide for uninterrupted operation of the devices, the installation comprises two or more such devices each of which is connected to a low-lift suction dredge 16 via the pipe 2 and a slurry feeding pipeline 14 (FIG. 6) provided with a check valve 15; to a sump 19 of the low-lift suction dredge 16 via the pipe 3 and a discharge pipeline 17 provided with a gate valve 18 (not shown in the figure); to a high-lift water pump 22 via the pipe 5 and a pressure water conduit 20 provided with a gate valve 21. The pump 22 is connected to a main pulp feeding pipeline 25 through the agency of the pressure water conduit 20 and a bypass water conduit 23 provided with a gate valve 24. The chambers 1 are connected to the main pulp feeding pipeline 25 by means of the pipes 6, via the relief pipelines 26 provided with check valves 27.

The device for hydraulic conveyance of loose materials operates as follows. From the bulk being hollowed out by a hydraulic giant, the loose material is fed into the sump 19 (FIG. 6) of the low-lift suction dredge 16 and is further pumped along the slurry feeding pipeline 14 and the pipe 2 (FIG. 1) into the chamber 1 emptied of any loose material but filled with the liquid remaining after discharge. The flow of the loose material being charged is segregated into two flows delivered to the portions of the wall of the chamber 1 arranged below the equatorial plane H so that the loose material slips down the walls whereby the chamber 1 is filled. The excess liquid contained in the chamber 1 is displaced by the loose material and is expelled, through the discharging pipe 3 and the discharge pipeline 17 (FIG. 6), to the sump 19. The excess liquid is discharged primarily from the upper layers containing the minimized amount of the loose material particles as in the course of charging, the loose material settles on the wall portions of the chamber 1 situated above the equatorial plane, which prevents its particles from being in suspension. Thus, the carryaway of the loose material particles by the liquid discharged is minimized.

To preclude swirling flows of the loose material and of the liquid that are liable to occur during discharge, and to prevent possible interaction between these flows, the device is provided with the partition plate 7 (FIG. 2).

In the case of increased operation efficiency of the device, hence greater amounts of the slurry and the liquid handled, or in the case of hydraulic conveyance of fine-particle loose materials (such as close or dust-like sands), provision is made in the device for the loose material flow shaper 10 made in the form of a single plate which guides the loose material flow towards the wall portions of the chamber 1 situated above the equatorial plane H, serves as a settler for a certain part of the loose material, and prevents the stirring-up of the loose material layer formed between the lower walls of the chamber 1 and the plate. If a plurality of the plates 12 (FIGS. 3, 4) are provided, the aforedescribed effect is strengthened, thus minimizing the amount of the loose material particles carried away by the liquid discharged, while ensuring a high operating efficiency of the device. Furthermore, when charging the chamber 1 is being completed and the loose material has been filled to the level of the spaces 8, 9, the partition plate 7 and the plates 13 operate as condensers whereby the loose material particles carried away by the liquid are settled on the plates.

Figure 6:
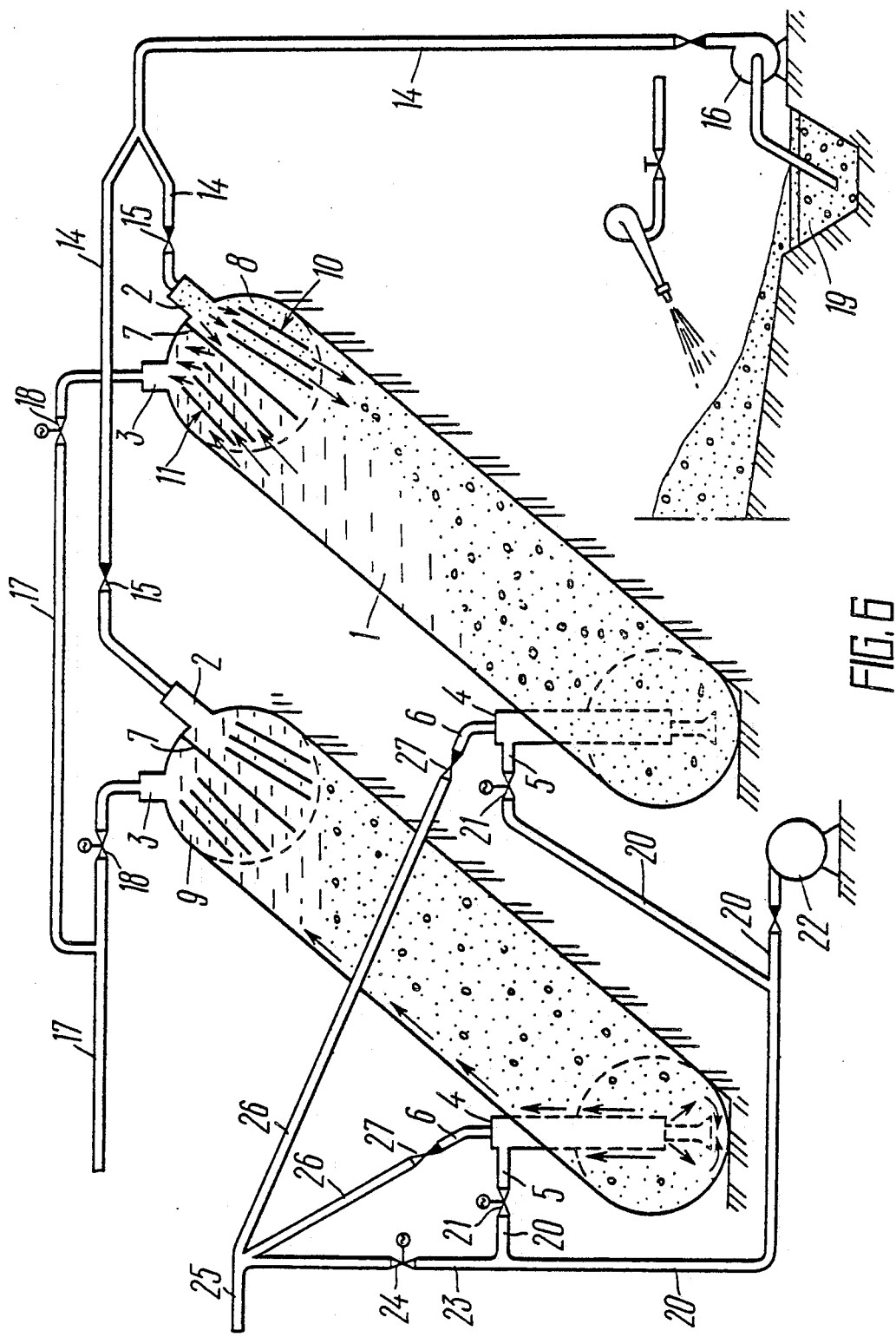
FIG. 6 is a general schematic view of an installation for hydraulic conveyance featuring two devices for hydraulic conveyance of loose materials, according to the invention.

From the chamber 1 (FIG. 1), the slurry is expelled through the discharging unit 4 into the main pulp feeding pipeline 25 (FIG. 6). As this takes place, a pressure liquid flow is admitted through the pipe 5 (FIG. 2) in the chamber 1 to mix with the loose material as to form slurry to be discharged through the pipe 6. As the chamber 1 is discharged, part of the liquid replacing the loose material being discharged is first transferred from the slurry formation zone situated at the inlet of the pipe 6 to its upper portion inside the chamber 1 and flows still further upwards, along the least resistance path, past the throat lower portion and, finally, it passes the portions of the chamber 1 that are located immediately above the throat lower portion and above the equatorial plane H. Thus, the liquid flow does not pass through the layers of the descending loose material, thereby preventing its classification, and does not resist the loose material flow as it moves towards the discharging unit 4. This makes the slurry density stable.

When one of the chambers 1 (FIG. 6) is being charged, the other one of the chambers 1 is being discharged. At this, in the chamber 1 being charged, the gate valve 21 and the check valve 27 are closed, while the gate valve 18 and the check valve 15 are open. In the chamber 1 being discharged, the gate valve 18 and the check valve 15 are closed, while the gate valve 21 and the check valve 27 are open. After one of the chambers 1 has been filled completely but before the gate valves 18 and 21 are shifted, the gate valve 24 of the bypass water conduit 23 is thrown open. After the gate valves 18 and 21 have been shifted, the gate valve 24 is closed.

What is claimed is:

1. A device for hydraulic conveyance of loose materials, comprising:
    a toroidal chamber having a meridianal plane and an equatorial plane thereof and arranged in such a way that an angle $\alpha$ defined between said equatorial plane and a horizontal plane, be within a range of $$\phi < \alpha < 90°,$$

where $\phi$ is the angle of internal friction of the loose material, when saturated with the liquid used for hydraulic conveyance;
    a first pipe for charging the loose material and a second pipe for discharging the liquid used for hydraulic conveyance, both of said pipes being arranged on one side with respect to said meridianal plane in the upper portion of said chamber;
    a slurry discharge unit arranged on the other side of said meridianal plane in the lower portion of said chamber.

2. A device for hydraulic conveyance of loose materials as claimed in claim 1, wherein the angle $\alpha$ defined between said equatorial plane of said chamber and a horizontal plane, be within a range of $$40° \leq \alpha \leq 45°.$$

3. A device for hydraulic conveyance of loose materials as claimed in claim 2, comprising:
    a partition plate provided in said chamber and arranged substantially in said equatorial plane so as to form a first space and a second space disposed one below the other; the first lower space being associated with the first pipe for charging the loose material; the second upper space being associated with the second pipe for discharging the liquid used for hydraulic conveyance.

4. A device for hydraulic conveyance of loose materials as claimed in claim 3, comprising a shaper of the flow of the loose material being charged into said chamber accommodated in the first lower space.

5. A device for hydraulic conveyance of loose materials as claimed in claim 3, comprising a shaper of the flow of the liquid discharged during charging the loose material, accommodated in the second upper space.

6. A device for hydraulic conveyance of loose materials as claimed in claim 3, comprising:
   a shaper of the flow of the loose material being charged into said chamber accommodated in the first lower space;
   a shaper of the flow of the liquid discharged during charging the loose material, accommodated in the second upper space.

7. A device for hydraulic conveyance of loose materials as claimed in claim 4, wherein said loose material flow shaper is made in the form of at least one plate set with respect to said partition plate at an acute angle whose vortex is directed towards the upper part of said chamber.

8. A device for hydraulic conveyance of loose materials as claimed in claim 5, wherein said discharged liquid flow shaper is made in the form of at least one plate set with respect to said partition plate at an acute angle whose vortex is directed towards the upper part of said chamber.

9. A device for hydraulic conveyance of loose materials as claimed in claim 7, wherein said loose material flow shaper is made in the form of a plurality of plates disposed at substantially the same acute angle with respect to said partition plate.

10. A device for hydraulic conveyance of loose materials as claimed in claim 8, wherein said discharged liquid flow shaper is made in the form of a plurality of plates disposed at substantially the same acute angle with respect to said partition plate.

* * * * *